(12) United States Patent
Cook

(10) Patent No.: US 7,340,411 B2
(45) Date of Patent: Mar. 4, 2008

(54) SYSTEM AND METHOD FOR GENERATING, CAPTURING, AND MANAGING CUSTOMER LEAD INFORMATION OVER A COMPUTER NETWORK

(76) Inventor: Rachael L. Cook, 123 N. Congress Ave., #112, Boynton Beach, FL (US) 33426

( * ) Notice: Subject to any disclaimer, the term of this patent is extended or adjusted under 35 U.S.C. 154(b) by 0 days.

(21) Appl. No.: 10/689,570

(22) Filed: Oct. 20, 2003

(65) Prior Publication Data
US 2006/0064340 A1   Mar. 23, 2006

Related U.S. Application Data

(63) Continuation of application No. 09/921,092, filed on Aug. 2, 2001, now abandoned, which is a continuation of application No. 09/031,443, filed on Feb. 26, 1998, now abandoned.

(51) Int. Cl.
*G06F 17/30* (2006.01)
(52) U.S. Cl. ...................................................... 705/10
(58) Field of Classification Search ................... 705/10
See application file for complete search history.

(56) References Cited

U.S. PATENT DOCUMENTS 5,930,764 A * 7/1999 Melchione et al. ............ 705/10
6,067,525 A * 5/2000 Johnson et al. ................ 705/10

OTHER PUBLICATIONS

Woods, Thomas & Judith Remondi. "Relationships Vital for High-Tech Marketers." Marketing News. vol. 30, No. 11, pp. 8-9. May 20, 1996.*

Fitzgerald, Michael. "Internet Data Collector Bows." Computerworld, vol. 29, No. 45, p. 12, Nov. 6, 1995.*
Loro, Laura. "From Call Center Direct to Net Has Launched an Internet Version of Its Comprehensive Advanced Lead Management System." Business Marketing, p. 9, Dec. 1997.*
Alexader, Devon. "Take the Lead Then Manage It: What Promotion Marketers Can Do to Get the Most from the Sales Leads They Generate." Potentials in Marketing, vol. 30, No. 11, p. 15(5), Nov. 1997.*

* cited by examiner

Primary Examiner—Susanna M. Diaz

(57) ABSTRACT

A customer lead management system that relates to a system and method for collecting and organizing customer-marketing data, which is then made available to business representatives to assess. Specifically, using a computer network, and data on a potential customer's Budget, Authority, Needs, Timeframe, and other related customer data is collected. While this data is being collected, the customer lead management system stores the customer lead data in real-time instantly, automatically ranking the viability of the customer lead on the interest level of the customer lead and other variable criteria used in the web-based algorithm calculation, and automatically electronically notifies the appropriate company and/or company representative about the customer lead. The resulting customer lead profile record is located in a web server database, and can be accessed and undated in real-time by a portable computer or electronic device that has been web-enabled. The customer lead data is then capable of being accessed via a computer network by various companies that have goods/services that satisfy the needs and requirements of the customer lead. A company representative can be automatically notified when a customer lead profile has been updated.

17 Claims, 9 Drawing Sheets

CUSTOMER NEEDS/FEEDBACK FORM — 18

MARKETING INFORMATION — 60

Q: How did they hear about us? (REQUIRED ENTRY FIELDS) — 62
    ___1. Published article (specify which publication):_____
    ___2. Published advertisement (specify which publication):_____
    ___3. Direct Mail Invitation
    ___4. E-Mail Invitation
    ___5. Internet (Specify web site):_____
    ___6. Other (please specify):_____

Q: How did this make them want to come to (name of marketing Campaign / Event / Meeting)/Web site — 64

If Article:
___Looked like an interesting article
___Liked what they read
___Wanted answers to their questions about what they read
If Advertisement:
___Looked like a neat-looking, innovative advertisement
___Liked what they read
___Wanted answers to their questions about what they read — 64a
If Direct Mail Invitation:
___Looked like nice, quality, innovative direct mail piece
___Liked what they read
___Wanted answers to their questions about what they read
If Internet Web Site:
___Looked like neat-looking, innovative announcement
___Liked what they read
___Wanted answers to their questions about what they read

CONTACT INFORMATION — 66

First Name: (REQUIRED ENTRY) — 68
    Last Name: (Separated for sorting purposes) (REQUIRED ENTRY) — 70
    Title/Position: (REQUIRED ENTRY) — 72
    Job Responsibilities: (Necessary because many times titles do not accurately describe what they actually do) — 74
    Company Name: (REQUIRED ENTRY) — 76
    Type of Business: — 78
    E-MAIL ADDRESS: (REQUIRED ENTRY) — 80
    Internet Address: — 82
    Street Address: (REQUIRED ENTRY) — 84   — 90
86 — City: (REQUIRED ENTRY) State: (REQUIRED ENTRY)
88 — Country: (REQUIRED ENTRY) Zip: (REQUIRED ENTRY)
94 — Telephone Number: (REQUIRED ENTRY) — 92

FIG. 2A

CUSTOMER NEEDS/FEEDBACK FORM (CONTINUED)

Fax Number: ~96
Mobil Number: ~98
Pager Number: ~100

/102

NEEDS/SOLUTIONS INFORMATION (This will vary for each seller's products and/or services and particular marketing Campaigns/Events/Meetings.)

Q: Rank on a scale from 1-10 (1- Most Important; 10- Least Important) how important these are to you NOW...

____Upgrading/Scalability
____Converting to Digital Technology
____Converting to Wireless Technology -Managing Content
____Adding Value to Existing Services
____Communicating Better with Internal and External Customers -Consulting Services
____Other (please specify):

_____
_____
_____

Q: Rank on a scale from 1-10 (1- Most Important; 10- Least Important) how important these will be to you in the FUTURE...

____Upgrading/Scalability
____Converting to Digital Technology
____Converting to Wireless Technology
____Managing Content
____Adding Value to Existing Services
____Communicating Better with Internal and External Customers -Consulting Services
____Other (please specify):

_____
_____
_____

INTERACTIVE SOLUTION (PRODUCT/SERVICE) QUESTIONS (Customize for type of marketing Campaign/Event/Meeting.) (For example: Solution -Fraud Management, Target Market -Wireless companies)

Q: How many wireless customers does your company serve?

____0-100    ____100-500    ____500-1,000    ____1,000-5,000    ____5,000-10,000
____10,000-25,000    ____Over 25,000

CUSTOMER NEEDS/FEEDBACK FORM (CONTINUED)

Q: What type of wireless air interface technology does your company have? (affects the likelihood of fraud)

_____AMPS _____CDMA _____TDMA _____GSM

Q: What geographic areas do you serve?

_____North America _____South America _____Europe _____Asia Pacific

Have a formula automatically calculate how many dollars per year they may be losing due to fraud based on their answers to the above questions. Then have the following statement pop-up:

"Based upon the information you have just provided us, it is estimated that without any fraud protection system installed, you could be losing as much as $XX million dollars per year. May we suggest you visit our Wireless Fraud Management System demonstration located here in the booth." ADD more Broadcasting Solution Questions here... ~106

Q: What Products/Services would you like to see in action? ~108

___Product/Service Name: (To be determined for each marketing Campaign / Event / Meeting and listed here)
___Product/Service Name: (To be determined for each marketing Campaign / Event / Meeting and listed here)
___Product/Service Name: (To be determined for each marketing Campaign / Event / Meeting and listed here)
___Product/Service Name: (To be determined for each marketing Campaign / Event / Meeting and listed here)
___Product/Service Name: (To be determined for each marketing Campaign / Event / Meeting and listed here)
___Product/Service Name: (To be determined for each marketing Campaign / Event / Meeting and listed here)
___Product/Service Name: (To be determined for each marketing Campaign / Event / Meeting and listed here)
___Product/Service Name: (To be determined for each marketing Campaign / Event / Meeting and listed here)

Q: What do you want these products/services to do for you? ~108a

CUSTOMER NEEDS/FEEDBACK FORM (CONTINUED)

COMMENTS/FEEDBACK — 110

In order to help us know if we are providing solutions you can use, please tell us what you think about the Broadcasting Solutions you have seen. Positive and/or negative comments are appreciated...

_____
_____
_____

WHAT WOULD YOU LIKE TO DO NOW? — 112

This section is interactive, providing immediate response to customer requests.

___ I would like to ask someone a few questions. — 114

If this option is selected, automatically notify appropriate Company Rep(s) via e-mail message or have a message pop-up on the Lead Management Intranet screen.

___ I would like to see some more detailed information or brochures. — 116

If this option is selected, have the collateral web pages from Internet site appear allowing customer to have collateral e-mailed, faxed or printed out.

___ I would like to see a specific solution in action. — 118

If this option is selected, have collateral web pages from Internet site appear allowing customer to select which product or service that they would like to see an online video clip of.

___ I would like to schedule an off-site meeting. Please have someone contact me. My contact information is listed above. — 120

If this option is selected, connect them to Lotus Notes Calendar of appropriate Company Rep(s) and automatically notify Company Rep(s).

___ I would be interested in a FREE week of consulting services. — 122

If this option is selected, automatically notify appropriate Company Rep.

Feel free to give one of our Solutions Experts a call...

\* Name of Solutions or Account Executive: — 124
Title: — 126
Tel: Fax: — 130  — 128
Pager: _____ 132
E-Mail Address: — 134
Internet Address: — 136

FIG. 2D

LEAD MANAGEMENT FORM ◄─────── 24, 26

CAMPAIGN/EVENT INFORMATION (This information will appear as default information on the Lead Management Intranet Site pages and needs to be changed for each marketing campaign or event. ─── 152

Marketing Campaign/Event Name: ──────────── 154
Marketing Campaign/Event Date: ──────────── 156
Marketing Campaign/Event Location: ──────────── 158
Marketing Campaign/Event Type: ──────────── 160
Marketing Campaign/Event Demographics Information ──────── 162
 If the event is a trade show or event: ──────── 164
 Booth Presentation Schedule: ──────────── 166
 Speaker Session Schedule: ──────────── 168
 Social Events: ──────────── 170
 Other Events/Happenings that customer can go to talk to): ──── 172

QUALIFICATION INFORMATION (Determining the BANT score) ─────── 174
(ALL FIELDS REQUIRED ENTRY)

Personnel Name: ──── 176    Date: ──── 178

180── Q:   What kind of BUDGET is this person working with?

182──    0.   This project will not get funding.
184──    1.   Funding will not be applied for or the budget would be insufficient for the solution.
186──    2.   Funding will be applied for and/or the budget size may be sufficient for the solution.
188──    3.   Funding has been applied for and/or the size of the budget may be sufficient for the solution.
190──    4.   Funding has been accepted but the amount has not been defined and/or the budget size is sufficient for the solution.
192──    5.   A defined amount of money is allocated and accepted to be used to fund this project and/or the budget size is sufficient for the solution.
193── Defined amount: $_____
194── Q:   What kind of AUTHORITY does this person have?
196──    0.   This person is not involved or has no influence with the project.
198──    1.   This person is an important person, but he/she is not involved in the project.
200──    2.   This person is involved with the project, but is not an influencer.
202──    3.   This person is a main technical/business influencer.
204──    4.   This person is preparing the request for proposal/requirements.
206──    5.   This person is a decision-maker.

FIG. 3A

LEAD MANAGEMENT FORM (CONTINUED)

208—Q: What kind of NEEDS does this person have?

210— ___0. This person does not have a need.
212— ___1. This person is not aware of the problem and is proposing a solution.
214— ___2. This person has identified a potential problem, but has not identified problem scope or requirements.
216— ___3. This person has identified a potential problem, but has not identified its full scope or requirements.
218— ___4. This person recognizes a problem and has defined some of the requirements.
220— ___5. This person recognizes a problem and has defined all requirements.
(We could put checkboxes here to help list requirements. These will vary per marketing campaign/event.)

222—Q: What kind of TIME FRAME is this person working with?

224— ___0. The project will not be executed.
226— ___1. This person is not ready to decide and has not identified a time frame for the decision.
228— ___2. This person is not ready to decide and has identified a time frame outside of next 12 months. 232  234  236  238
230— ___3. This person is not ready to decide, but has determined a decision date. Specify decision date: -Next few weeks -Next few months -Next year -Next few years
240— ___4. This person is ready to decide and has a general time frame. Specify time frame: -Next few weeks -Next few months -Next year -Next few years
250— ___5. This person is ready to decide and has a specific time frame dates. Specify time
252—frame dates:  242   244   246   248
254— Total BANT Score: (Determines lead priority and distribution)

<u>MARKETING INFORMATION</u> ———————256

258—Q: How did they hear about us? (REQUIRED ENTRY FIELDS)

260— ___1. Published article (specify which <u>publication</u>):
262— ___2. Published advertisement (specify which publication):
264— ___3. Direct Mail Invitation
266— ___4. E-Mail Invitation
268— ___5. Internet (Specify web site):
270— ___6. Other (please specify)

272—Q: How did this make them want to call or come to (<u>name</u> of marketing event)?

274—If Article:
276— ___Looked like an interesting article
278— ___Liked what they read
280— ___Wanted answers to their questions about what they read
282—If Advertisement:
284— ___Looked like a neat-looking, innovative advertisement
286— ___Liked what they read

FIG. 3B

LEAD MANAGEMENT FORM (CONTINUED)

288— ___ Wanted answers to their questions about what they read
290— If Direct Mail Invitation:
292— ___ Looked like nice, quality, innovative direct mail piece
294— ___ Liked what they read
296— ___ Wanted answers to their questions about what they read
298— If Internet Web Site:
300— ___ Looked like neat-looking, innovative announcement
302— ___ Liked what they read
304— ___ Wanted answers to their questions about what they read

CONTACT INFORMATION ——————————306

308— First Name: (REQUIRED ENTRY)
310— Last Name: (Separated for sorting purposes) (REQUIRED ENTRY)
312— Title/Position: (REQUIRED ENTRY)
314— Job Responsibilities: (Necessary because many times titles do not accurately describe what they actually do)
316— Company Name: (REQUIRED ENTRY)
318— Type of Business:
320— E-MAIL ADDRESS: (VERY VERY IMPORTANT!) (REQUIRED ENTRY)
322— Internet Address:
324— Street Address: (REQUIRED ENTRY)
326— City: (REQUIRED ENTRY)
328— State: (REQUIRED ENTRY)
330— Country: (REQUIRED ENTRY)
332— Zip: (REQUIRED ENTRY)
334— Telephone Number: (REQUIRED ENTRY)
336— Fax Number:
338— Mobil Number:          342
340— Pager Number:

SOLUTIONS INFORMATION (This will vary for each marketing campaign/event.)

344— Product/Service Name: (To be determined for each marketing campaign/event and listed here)
346— Product/Service Number (if applicable):
348— Company Representative Name:
350— Feedback/Comments: (Subdivide this into two categories: Positive/Negative)

FIG. 3C

LEAD MANAGEMENT FORM (CONTINUED)

<u>FOLLOW-UP/TRACKING INFORMATION</u> ———————— 352
(To be integrated with Lotus Notes Calendar feature for scheduling individual or group. This page needs to be able to repeat and link together so we can track the progress of the lead. ALL FIELDS ARE REQUIRED ENTRY.)

354 — Follow-Up Date:
356 — Follow-Up Priority:
358 — ___ HOT BUSINESS OPPORTUNITY - Ready to Buy Now; Contact Immediately; Add to corporate marketing database.
360 — ___ VERY WARM LEAD - Very Interested; Favorable BANT; Contact Immediately; Add to corporate marketing database.
362 — ___ WARM LEAD - Interested; Wants More Information; Favorable BANT; Contact Soon.
364 — ___ LUKEWARM LEAD - Interested; Unfavorable BANT; Contact in 3 mos.-6 mos.-12 mos.
366 — ___ COLD LEAD - Not Interested; Unfavorable BANT; No Action Required
368 — ___ MISDIRECTED LEAD - Direct to Group other than _____ (varies per marketing campaign/event)
372 — Follow-Up Person:          378    370    380
374 — Follow-Up Status:
376 — ___ Referred to someone else (specify whom):_____ why:_____
382 — ___ Scheduled Follow-Up Call.
384 — ___ Scheduled Follow-Up Meeting - Sent Information
386 — ___ Contract Negotiations
388 — ___ Sale/Deal (Specify Potential Business) $_____ ———— 390
392 — ___ Other (please specify):_____
                    394

FIG. 3D

SYSTEM AND METHOD FOR GENERATING, CAPTURING, AND MANAGING CUSTOMER LEAD INFORMATION OVER A COMPUTER NETWORK

This application is a continuation of my application Ser. No. 09/921,092, filed Aug. 2, 2001 now abandoned which is a continuation of application Ser. No. 09/031,443, filed Feb. 26,1998, now abandoned the disclosures of which is hereby incorporated by reference.

TECHNICAL FIELD

The present invention relates to a web-based system and method for using a computer network for generating, capturing, analyzing, storing, disseminating, and managing customer lead data. Specifically, the present invention is directed toward processing customer lead data which includes the following types of information: contact data, data relating to the needs of the customer, and the customer's interests. Additionally, the present invention manages customer purchase or qualification information, known as BANT data, which includes information relating to Budget, Authority, Need, and Timeframe of the customer. The present invention captures this data and distributes it via a computer network to the appropriate company representative, preferably via a cryptographically secure web-interface. Further, the present invention allows management to track the progress of each specific customer lead, including data relating to the customer's needs, and the customer's request for specific product/service information. As a result, the present invention allows the company that is offering its goods/services to the customer to monitor its customer relationships development, so as to improve its product development, its business and marketing strategies, and its customer's satisfaction with the business' goods or services.

BACKGROUND OF THE INVENTION

Typically, sales, marketing and customer service personnel use computers to track customer lead data such as: prospective customer contacts, needs, interests, purchase potential, and satisfaction information in computerized databases and spreadsheets. However, the need to access, distribute and manage this information by many different individuals or entities that were not in the same geographic location presents a problem. People could not access this customer lead data because they did not have the same software program, did not know how to use the software program, or could not read the lead data. Furthermore, the customer lead data was not in a consistent format, so progress on the customer lead could not be tracked. Because of the system's inability to track a customer lead, lead data that had become obsolete was not updated, and a company's resources were then wasted on "dead" leads. In addition, numerous companies distribute customer lead data by sending originals or copies of business cards or handwritten "lead sheets" in the company's interoffice mail which are either lost or illegible and as a result, are not followed up on.

With the advent of the Internet, companies/sellers are promoting their products and services on their web sites and prospective customers contact the company via e-mail, phone or fax to request additional information regarding a company's goods or services. Trade shows, business events, and one-on-one sales meetings usually provide a business with the lowest rate of return on investment. This is primarily due to the fact that there is no system in place on the floor of the trade show or event to capture, qualify, distribute, and manage customer lead data. As a result, the company selling the goods or services is unable to provide the customer with requested information regarding the product or service sought by the customer.

SUMMARY OF THE PRESENT INVENTION

It is an object of the present invention to provide a web-based system and method of using a computer network for generating, capturing, analyzing, storing, disseminating, and managing potential customer or lead data via a computer network. Thus, the present invention allows the user to input, access and collect customer lead information via a personal computer, or any other similar data acquisition/transmission device that is capable of accessing a computer network. When a company representative is using the present invention, the user is also able to receive automatic updates of new potential customer leads as the customer lead data is entered into a customer lead database, either by a sales representative or a customer. Additionally, the present invention accommodates potential customers who are attending trade shows that have identification cards that contain a unique code corresponding to each customer. Once the card is scanned, the present invention uploads the data to the lead management database. As the company/seller collects customer lead data, the present invention allows the business to develop customer profiles that are based on the customer lead data. These profiles may include the business's customer contact information, the customer's specified needs, specified interests, and the customer's purchase potential.

Additionally, the needs that the customer lead has specified are synchronized with the products or services in the lead management database. Here, the present invention matches the customer's product/service need requirements to the products and services that the company or its business partners provide. As a result, the company's representative is automatically apprised of the match between customer and company/seller. The present invention also allows a business to respond to customer requests by sending product and service information in an e-mail to the inquiring customer. In addition, the present invention allows the user to determine customer lead priority and may include information regarding the customer's BANT (Budget, Authority, Need, and Timeframe) purchase potential information, and can calculate the level of priority needed. Furthermore, the business using the present invention can access the customer lead information immediately upon the lead data being stored in the lead management database. Finally, the present invention allows the business to track performance, respond to customer needs or inquiries, via the computer network.

BRIEF DESCRIPTION OF THE DRAWINGS

FIGS. 2A through 2D are a chart that illustrates a sample customer feedback form that is accessed by a customer lead via a computer network.

FIGS. 3A through 3D are a chart that illustrates a sample lead management form that is used by the seller of good/services to input lead qualification information (BANT data) and product and/or service interest information.

DETAILED DESCRIPTION

Figure 1:
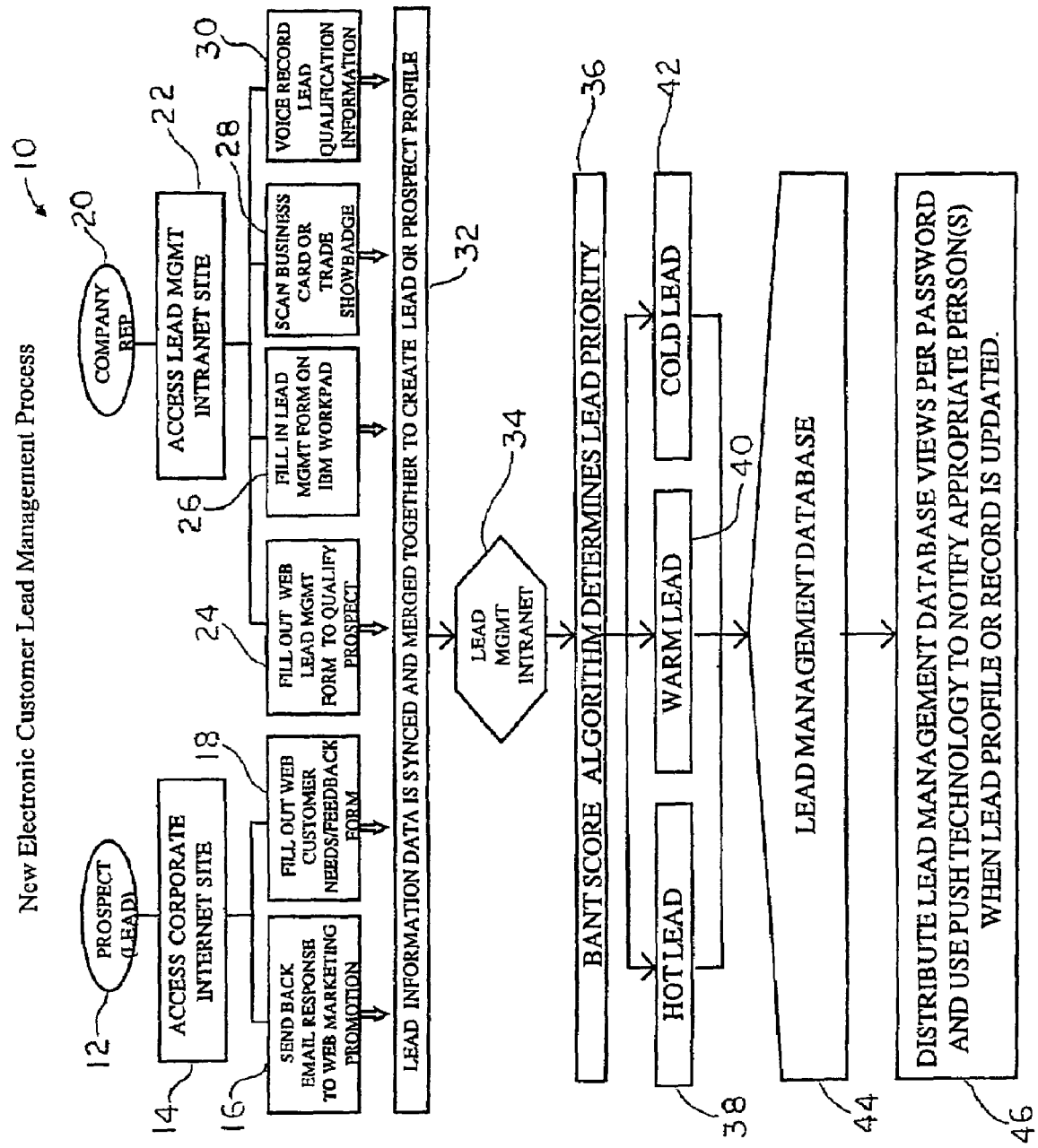
FIG. 1 is a schematic drawing illustrating the functionality of the components of the present invention.

An embodiment of the customer lead management system 10 is illustrated in FIG. 1. In one embodiment, the customer lead management system 10 is designed to capture and store customer lead and customer needs data concerning particular products and/or services using real time database synchronization for multiple end-users on a computer network. This system is for tracking the progress of prospective buyer "leads" into buying customers and following up to ensure customers are satisfied and remain customers. (In marketing terms, this is called customer acquisition and retention.)

Customer lead 12 may access the business's web site 14 via a connection on a computer network such as the internet using a personal computer, or any other type of similar device, capable of accessing a computer network. Once the customer lead 12 accesses the company's web site 14, the customer lead 12 proceeds to view various marketing promotions that the business has created Upon selecting a desired marketing promotion, the customer lead 12 has two main methods in which he can request additional information regarding the desired product or service. The customer lead 12 can also request additional information at the end of the customer needs feedback form 18 (See 116 in FIG. 2D). The first method in which a customer lead 12 can request additional information is by sending an e-mail message to the designated seller's (company representative 20) e-mail address 16 requesting the additional product/service information. The specific nature or content of the request is detected automatically by web administrative software and the appropriate response is e-mailed back to the lead or customer lead 12. This response back to the customer lead 12 may be comprised of an e-mail text message or an e-mail test message with a file attachment containing an "e-brochure" or "e-collateral." An "e-brochure" or "e-collateral" contains information relating to the products or services that the company is promoting and allows the customer lead 12 to print the information out at his or her local printer. The second method a customer lead 12 can use to respond to a business's marketing promotion is to fill out a customer needs/feedback form 18, illustrated in FIGS. 2A-2D, and is linked to the promotional marketing offer, located on the company's corporate (Internet) web site 14.

FIGS. 2A-2D show a sample form that illustrates the components of a sample customer needs/feedback form 18. The questions on this form 18 are designed to be incorporated into a virtual reality activity or a regular CGI script form, which can be integrated into the company/seller's existing Internet web site 14 and linked to the seller's Lead Management Intranet site 22 (See 34 in FIG. 1). This form 18 could be a fun game-type virtual reality activity to be integrated into an existing Internet web site and linked to a Lead Management Intranet site 34. This is to give a complete picture of how the company can help the customer. It becomes possible to match what the customer lead 12 indicates they really want or need to the solutions the company representative says the customer lead 12 is interested in to provide a total solution. This form 18 is designed to be filled-out by the customer lead 12 and should be needs oriented, in contrast to the Lead Management Form 24, 26, which is designed to be filled out by the company representative 20 and is qualifications and solutions oriented. These two forms 12 and 24, 26 are linked to form a lead profile record 32 in the lead management database 44 and will be accessible via the lead management intranet site 34. The first field that the customer lead is prompted to enter information into is entitled Marketing Information 60. The user has the option of entering text or selecting a check box to indicate his or her desired selection. Specifically the customer lead 12 is prompted to answer the question "How did the customer lead come to know of the business?" 62 The customer lead 12 is given the option of several answers that he or she may select that include: by published article, by published advertisement, by direct mail invitation, by e-mail invitation, by internet web site, or by other. The customer lead 12 is further prompted to answer "How did the particular promotional method make the customer want to come to the meeting, campaign event, or web site?" 64. A list 64a of possible choices is presented to the customer lead 12 to select from. The customer lead 12 is also prompted for contact information 66 including his or her first name 68, last name 70, the customer's title or position 72, job responsibilities 74, company name 76, type of business 78, e-mail address 80, internet address 82, street address 84, city 86, country 88, state 90, zip code 92, customer's telephone number 94, fax number 96, mobile pone number 98, and pager number 100. The next section that the customer lead 12 must enter data into on the customer needs/feedback web page 18 is entitled "Needs/Solutions Information" 102. In this section 102, the customer lead 12 will be required to rank specific attributes of the business's products or services based on importance to the customer lead 12. After all of the preceding data is entered by the customer lad 12, the Customer Needs/Feedback form 18 prompts the customer lead 12 with as series of targeted questions 104 that allow the customer lead management system 10 to compute a solution to the Customer lead's 12 problem. Furthermore, for the sample customer needs/feedback form 18, the customer lead management system 10 computes a monetary amount 106 that the customer lead 12 may be losing by not employing the company's goods or services. After the feedback form 18 has selected an optimized solution to the customer lead's 12 problem, the customer lead management system lists a range of potential product/service solutions that the customer lead 12 may be interested in. The customer lead 12 is prompted to select the goods or services that it desires to view 108. The customer lead 12 is prompted to select the goods or services that it desires to view 108. The customer lead 12 is also prompted to provide an explanation 108a of what the selected products/services do for him. Additionally, the feedback from 18 provides the customer lead 12 with the ability to comment on the company's products and services in the comments/feedback section 110. Finally, the customer needs/feedback form 18 provides the customer lead 12 with a series of options 112 that allows the customer lead 12 to choose a particular curse of action regarding the business's goods and services. These options 112, include the ability of the customer lead 12 to request to ask the company questions regarding its offered goods and services 114. If the customer lead 12 selects this option 114, a company representative 20 is automatically notified with the customer lead's request via e-mail or by a pop-up window via the Lead management Intranet 22. The customer lead 12 may also request detailed information or brochures 116. If the customer lead 12 selects this option, collateral web pages from the company's Internet site 14 appear allowing customer to have the product/service documentation e-mailed, faxed, or printed out for the customer lead 12, locally on demand. The customer lead 12 can also select to view a specific solution in action 118. If the customer lead 12 selects this option 118, collateral web pages from the company's Internet site 14 appear allowing the customer lead 12 to select which product or service the customer lead 12 would like to view an online video clip of.

Additionally, if the customer lead 12 is attending a trade show the company representative 20 could demonstrate the product or service for the customer lead 12 in person. The customer lead 12 may also select to schedule an off-site meeting 120. If this option 120 is selected, the customer lead 12 is connected to Lotus Notes Calendar and the appropriate company representative 20 will be automatically notified, by e-mail or an on-screen message alert, of the customer lead's 12 desire to schedule a meeting. The final option that the customer lead 12 is provided with is a promotional offer from the company 122. If the customer lead selects this option 122, the appropriate company representative 20 that deals in the specified goods or services is automatically notified by an e-mail message or pop up computer screen messages via the lead management intranet 22. The last item on the customer needs/feedback form 18 is the name of the solutions/account executive 124, the title of the executive 126, telephone number 128, fax number 130, pager number 132, e-mail address 134, and Internet address 136 of the executive.

Alternatively, the company representative 20 can enter customer lead data into one of the lead management forms 24, 26 (a sample form 24, 26 is shown in FIGS. 3A-3D) as he or she is engaging a potential customer lead 12 in a conversation. Lead management form 24 is a web-based form and lead management form 26 can be used when the company representative 20 is using a portable computer. The form content may be similar for both forms 24, 26 or form 26 may be condensed and reformatted to accommodate the smaller screen of a portable devices such as an IBM Workpad™ (a remarketed version of the Palm Pilot). In a trade show scenario or any one-on-one interpersonal contact scenario, it would be more advantageous if the customer lead 12 filled out the Customer Needs Feedback form 18 before he talks to the seller or company representative 20, however this is not required. Furthermore, by allowing the company representative 20 to initiate a personalized conversation such as "Hi, my name is Ed. Glad to meet you John Doe. Let me pull up your profile . . . ". The seller or company representative 20 can enter the customer lead's contact, needs, product/service interests and marketing campaign information, what brought them to the web site or event, etc. data into the Customer Needs/Feedback form 18 as the representative 20 proceeds to talk with the customer or while showing the product/service features/benefits to the customer lead 12. During or at the end of the meeting, with the customer, the company representative 20 can then input the data needed for the Lead management form 24, 26. If a mobile device is used, such as an IBM Workpad™ Palm Pilot, then the input by the company representative 20 could be entered into 26 during the customer lead 12 engagement/interaction. If a Customer Needs/Feedback form 18 has been filled out completely, the company representative 20 will not have to enter any other type of information except for Campaign/Event Information 152, Qualification or BANT information 174, Solutions Information 342 and Follow-Up Information 352.

In order for the company representative 20 to access and input customer data into the sample lead data form 24, 26 illustrated in FIGS. 3A-3D, the seller/company representative 20 accesses the company's Intranet site 22 by entering a security code or password to access the sellers' virtual private network or intranet for the lead management database 44. The company representative 20 may access the lead management Intranet site 22 in a variety of ways that include using a personal computer, or any other device that is capable of transmitting and receiving data via a computer network. The company representative 20 may or may not physically be at a trade show, business event or at another one-on-one kind of interpersonal meeting with customer leads 12. The seller or company representative 20 accesses the lead management form 24, 26 illustrated on FIGS. 3A-3D on any of the following mobile telecommuting systems and proceeds to ask the lead or customer for answers to the questions on the lead management form, which include contact, product and/or services interest, and BANT information, solutions, campaign/event, follow-up/tracking, marketing awareness, etc.:

Microcassette recorder
Portable computer
Digital portable dictation system with voice recognition software
Hand-held electronic input device
Business card, identification card, or trade show badge scanner.

With a microcassette recorder, the company representative 20 records the customer lead 12 information and later plays the recorder into a digital recorder program such as Media Player, saves the recording as a WAVE file (.WAV) and imports it into any word processing program. The customer lead 12 information is then saved as an HTML file and published to the Lead Management Intranet Site 22 (WordPro™ allows the publication of documents directly to an Internet site if you have access to a POP server) or copied to a Lotus Domino-enabled, Lotus Notes® Workroom for distribution, follow-up and tracking. A customer representative 20 can access the .WAV file, listen to the responses and input the responses into the lead management form 24, 26 and customer needs feedback form 18.

When using a portable computer, if the portable computer has voice recognition software, the company representative 20 runs the voice recognition software, such as ViaVoice®, in a background session, while running a marketing campaign/event or demo/presentation on the active portable computer session. The company representative 20 plugs in the ViaVoice® headset into the portable computer and can talk into it after the demo/presentation or to record responses to the lead management form 24, 26 and customer needs feedback form 18. The company representative 20 can then switch to ViaVoice® to record what the customer lead 12 says about the demo/presentation. If the portable computer has internet/intranet access, the company representative 20 enters the information into the online Lead Management Form 26 or customer needs feedback form 18, if necessary on the Lead Management Intranet 22. Passwords for company representatives 20 can be assigned according to sales territory, need to know, etc. If the marketing campaign, event, demonstration or presentation is on a portable computer with network access such as the Internet and the computer has voice recognition functionality, these two tasks can be performed simultaneously.

When using a digital portable dictation system, the company representative 20 talks into the digital portable dictation system, such as the Digital Portable Dictation System co-produced by IBM and Olympus with ViaVoice® speech recognition speech-to-text conversion software, during product demonstrations and paraphrases the thoughts that the customer lead 12 speaks during the demonstration to record how the customer lead 12 responded to what he heard and saw and to record responses to the lead management form 24, 26 and customer needs feedback form 18. To transfer the information into Lotus Notes®, the converted recorded information is saved in any word processing program as an ASCII text file (.TXT) or rich text format (.RTF).

The file contents are then copied to a Lotus Notes® Workroom named the Marketing Campaign/Eventroom. To transfer the information into the Lead Management Intranet Site 22, the converted recorded information is saved as an HTML file. Next, the HTML file is published by using a Publish to Internet feature in a program such as WordPro™ to the Lead Management Web Site 22 or is copied to a Lotus-Domino-enabled Lotus Notes® Workroom for distribution, follow-up and tracking.

With a hand-held electronic input device, such as an IBM WorkPad® or a PalmPilot®, the customer representative 20 enters the customer lead's 12 responses into a customized lead management form 26 that is essentially the same as the Lead Management Form 24, only customized to accommodate a smaller display screen. If the hand-held electronic input device is Internet ready, the information can be hot-synced and transmitted electronically to the Lead Management Intranet site 22 in real time. If the device is not Internet ready, the information is saved on the device as an ASCII text file (.TXT) or a rich text format file (.RTF). The file contents are then copied to a Lotus Notes® Workroom Marketing Campaign/Eventroom. To transfer the information into the Lead Management Intranet Site 22, the entered information is saved as an HTML file. Next, the HTML file is published by using a Publish to Internet feature in a program such as WordPro™ to the Lead Management Web Site 22 or is copied to a Lotus-Domino-enabled Lotus Notes® Workroom for distribution, follow-up and tracking.

Finally, the company representative 20 can enter customer lead 12 information from a business card using an electronic business card scanning device, such as Card Scan®, or from an identification card such as a trade show visitor badge with a magnetic stripe, bar code, or other form of encoded information using an appropriate scanner. The scanned information is later uploaded or transmitted electronically to the Intranet site 34 using forms software such as that which comes with Card Scan® or other scanners.

Next, FIGS. 3A-3D illustrates the lead management form 24, 26 of the customer lead management system 10 and the information concerning the customer lead 12 that is entered by the company representative 20. The first section of the lead management form 24, 26 is entitled Campaign/Event Information 152. This section is adapted by the company in accordance with its marketing promotions and campaign events. Specifically, this information comprises the name 154, date 156, location 158, type 160, and demographics 162 information that relate to the marketing campaign and event. Additionally, the company representative 20 is prompted to specify if the event will be a trade show or other type of event 164. If the event is a trade show, the company representative 20 is further prompted to enter information relating to the booth presentation schedule 166, speaker session schedule 168, the social events that are taking place at the trade show 170, and any other activities that a customer lead 12 can be involved in 172.

The next section of the lead management form 24, 26 is entitled Qualification Information 174, requires the company representative 20 to enter his or her name to indicate the name of the person who is filling out the form 176, and the date on which the form 24, 26 is being filled out 178. The following paragraphs define BANT, Budget, Authority, Need and Timeframe.

BUDGET—In this section 174, the company representative 20 is prompted to answer several questions that relate to the budget 180 of the customer lead 12. Specifically, the company representative 20 is required to select from a series of check boxes that describe the funding characteristics of the customer lead 12, which include "This project will not get funding" 182; "Funding will not be applied for or the budget would be insufficient for the solution" 184; "Funding will be applied for and/or the budget size may be sufficient for the solution" 186; "Funding has been applied for and/or the size of the budget may be sufficient for the solution" 188; "Funding has been accepted but the amount has not been defined and/or the budget size is sufficient for the solution" 190; and "A defined amount of money is allocated and accepted to be used to fund this project and/or the budget size is sufficient for the solution" 192, and the company representative 20 then enters the defined amount 193.

AUTHORITY—The company representative 20 is next prompted to enter information relating to what kind of authority the customer lead 12 has 194. The company representative 20 is required to choose from a list, the business role, signature authority, or financial decision making attributes that most resemble that of the customer lead 12. Specifically, these attributes include: "This person (customer lead) is not involved or has no influence with the project" 196; "This person (customer lead) is an important person, but he/she is not involved in the project" 198; "This person (customer lead) is involved with the project, but is not an influencer" 200; "This person (customer lead) is a main technical/business influencer" 202; "This person (customer lead) is preparing the request for proposal/requirements" 204; or "This person (customer lead) is a decision-maker" 206.

NEEDS—The company representative 20 is next required to select from a list of attributes that most closely characterizes the specific needs 208 of that customer lead 12. Specifically, the company representative 20 may select from the following characterizations: "This person does not have a need" 210; "This person is not aware of the problem and is proposing a solution" 212; "This person has identified a potential problem, but has not identified a problem scope or requirements" 214; "This person has identified a potential problem, but has not identified its full scope or requirements" 216; "This person recognizes a problem and has defined some of the requirements" 218; and "This person recognizes a problem and has defined all requirements" 220. Additionally, if the customer lead 12 had defined requirements and the company representative 20 checked this last item 220, a checkbox bulleted list could be provided to assist the company representative 20 in filling in the defined requirements.

TIMEFRAME—The next set of information that the company representative 20 is required to submit relates to the time frame 222 for a purchasing decision on the part of the of the person (customer lead 12). The company representative 20 is prompted to select from a list of attributes, the characteristics that most closely resemble the expected time frame of the customer lead 12. Specifically, the company representative 20 can select from the following attributes which include: "The project will not be executed" 224; "This person is not ready to decide and has not identified a time frame for the decision." 226; "This person is not ready to decide and has identified a time frame outside of the next 12 months" 228; "This person is not ready to decide, but has determined a decision date." 230. For this attribute 230, the user is further prompted to select a decision date from a list that comprises the following selections: "Next few weeks" 232; "Next few months" 234; "Next year" 236; and "Next few years" 238. The next attribute that the company representative 20 may select is "This person is ready to decide and has a general time frame" 240. For this attribute, the user is further required to select from the following selections:

"Next few weeks" 242; "Next few months" 244; "Next year" 246; and "Next few years" 248. The final attribute that the company representative 20 can select is "This person is ready to decide and has specific time frame dates" 250. If the company representative 20 selects this attribute 250, the time frame dates must be specified by inputting them into the "Specify time frame dates" field 252.

After all of the questions relating to budget 180, authority 194, needs 208, and time frame 222 of the customer lead 12 are answered, a BANT score 254 is calculated in real time and displayed immediately. This BANT score 254 is used to determine the customer lead 12 priority on the Follow-up/Tracking section of the form and will be used to determine what type of follow-up approach the company representative 20 will pursue with respect to the customer lead 12.

The next category of information that the lead management form requests is directed to Marketing Information 256. The first question 258 in this field prompts the company representative 20 to select how the customer lead 12 came to know of the company. The company representative 20 enters the information relating to how the customer lead 12 came to know of the company by selecting one or more of the following responses that include: "Published article (specify publication)" 260; "Published advertisement (specify publication)" 262; "Direct Mail Invitation" 264; "E-mail Invitation" 266; "Internet" (specify web site) 268; or "Other" (please specify) 270. The listed choices represent types of marketing promotions The company representative 20 is also prompted to answer the question "How did the marketing promotion make the customer want to call or come to the marketing event?" 272. To answer this question the company representative 20 has the option of selecting "Article" 274; "Advertisement" 282; "Direct Mail" 290; and "Internet Web Site" 298. If the company representative 20 selects "Article" 274, the company representative 20 is prompted to determine why the customer lead 12 became interested in the article, by selecting one of the following choices based on the customer lead's 12 answer: "Looked like an interesting article" 276; "Liked what they (customer lead 12) read" 278; or "Wanted answers to their questions about what they read" 280.

If the customer lead 12 selects advertisement 282, the company representative 20 may select one of the following options based on the customer's answer: "Looked like a neat-looking, innovative advertisement" 284; "Liked what they read" 286; or "Wanted answers to their questions about what they read" 288. If the company representative 20 selects direct mail invitation 290, the company representative 20 may select one of the following items based on the customer lead's 12 answer: "Looked like nice, quality, innovative direct mail piece" 292; "Liked what they read" 294; or "Wanted answers to their questions about what they read" 296. If the company representative 20 selects Internet web site 298, the company representative 20 may select one of the following items based on the customer lead's answer: "Looked like neat-looking, innovative announcement" 300; "Liked what they read" 302; or "Wanted answers to their questions about what they read" 304.

The next section of the lead management form 24, 26 is entitled Contact Information 306. This section 306 contains contact data relating to the customer lead 12, so that in the event the customer lead 12 needs to be reached, the customer lead 12 can be easily located. Specifically, in the contact information section 306, the company representative 20 enters the following information regarding the customer lead 12: first name 308, last name 310, title/position of the customer lead 12 within the company 312, job responsibilities of the customer lead 314, company name where the customer lead 12 is employed 316. Additionally, in the contact information 306 section, the company representative 20 enters the type of business 318 the customer lead 12 is in, and information for contacting the customer lead 12 which includes: e-mail address 320, internet address 322, street address 324, city 326, state 328, country 330, zip code 332, telephone number 334, fax number 336, mobile phone number 338, and pager number 340.

The next section that the company representative 20 is asked to enter information relating to the customer lead 12 is entitled Solutions Information 342. In this section, the company representative 20 enters information about the customer lead 12 that includes: the product/service name 344 which is determined for each marketing campaign, product/service number 346, company representative name 348, and feedback/comments 350, which will be divided into two categories, positive and negative.

The final section of the lead management form 24, 26 is entitled Follow-Up/Tracking information 352. In this section, the company representative 20 enters information relating to the following: follow-up date: 354. The follow-up priority 356 is automatically completed based upon the BANT score 254 with one of the following options: hot business opportunity 358, very warm lead 360, warm lead 362, lukewarm lead 364, cold lead 366. In the event this particular customer lead has been directed to the wrong group, the company representative can check misdirected lead 368. The misdirected lead 368 option allows the company representative 20 to direct the customer lead 12 to another group. This is done by filling in an alternate group name to which the customer lead 12 should be directed 370. This alternate group is notified by an automatically generated e-mail notification or alert message. Additionally, the company representative 20 is prompted to enter additional information relating to the customer lead 12 that includes follow-up person 372; follow-up status 374; whether the customer lead 12 was referred to someone else 376; and if so, to whom 378 and the reason why 380. The company representative 20 is also prompted by the lead management form 24, 26 to enter information relating to whether a follow-up call has been scheduled 382, whether a follow-up meeting was scheduled and information sent 384, whether contract negotiations have been initiated 386, whether a sale or deal has been reached 388, and if so for how much 390, and any other pertinent information 392, which must be specifically stated 394.

The Follow-up/Tracking Information 352 is integrated with Lotus Notes® calendar feature for scheduling individual or group follow-up items. The company representative 20 is permitted to append new Follow-up/Tracking Information 352 to the customer lead profile record 32 and is allowed to group the information 352 together by customer lead 12 or other data fields. The Follow-up/Tracking Information 352 is repeated as necessary for the different required follow-up status action items. The various follow-up status action items are linked together to allow tracking of the progress of the customer lead 12. Appropriate person(s) are automatically notified by e-mail or an action alert when follow-up status is updated.

Turning back to FIG. 1, once the company representative 20 finishes entering data into the lead management form 24, 26, the information contained in lead management form 24, 26 automatically synchronizes with the information already in the lead management database 44 and populates the form accordingly 32. If the seller or company representative 20 is on-site with a customer lead 12 at a trade show or other business event or meeting, the seller or company representative 20 may use a voice recorder to capture the lead qualification information 30 or may scan the customer lead's 12 business card using a business card scanner like the one sold under the trademark CardScan® and/or scan the lead or customer's identification card using a scanner 28. The data from these scanning devices automatically synchronizes 32 with the data in the lead management database 44 and populates the lead management form 24, 26 in real time with contact information and other information encrypted on the badge or identification card. This may require the card scanning software and the identification card scanning software to convert the captured data into ASCII text that is then converted to HTML.

After the customer lead 12 data capture options have been utilized, the data from each is merged together to create a complete lead or customer profile 32 which is stored in the lead management database 44. Lead priority is then calculated in real time by a BANT algorithm 36 that automatically calculates a BANT score ranking from 0 to 5. The BANT score is a numerical identifier that ranks the priority of customer lead 12, where the higher the BANT score, the higher the lead priority. For example, a BANT score of 5 would be considered a "hot" lead 38, a BANT score of 3 would be considered a "warm" lead 40, and a BANT score of 0 would be considered a "cold" lead 42 and distributed accordingly. Once the BANT score is determined, selected data fields in the Follow-Up/Tracking section of the lead management form 24, 26, whose data is contingent upon the BANT score, are populated A further aspect of the customer lead management system 10 is to provide global access and distribution of the customer lead data contained in the lead management database 44 via "push" technology such as by automatic e-mail. "Push technology" is computer or electronic based technology that automatically distributes information when a triggering event has occurred. A user does not need to log in or connect to a server to check for updated or changed information. When the information has been updated, the server automatically notifies the user by "pushing" the information out to the user. Here, the customer lead management system 10 sends ("pushes") the customer lead data to a specific company representative 20, if certain criteria specified by the company representative 20, such as goods/services needed, have been selected by the customer lead 12. Alternatively, the company representative 20 can view the profiles for the customer leads 12 stored in the lead management database 44 via the lead management Intranet site 22. Passwords are assigned 46 to access the lead management intranet 22 according to the seller's organizational needs, i.e. market segment divisions, levels of authority, sales territories, business partners, etc. Reports can be generated for tracking purposes of customer lead progress, conversion of customer leads to sales, customer satisfaction levels, and marketing and product development purposes to tabulate demographic information and product and/or service features and benefit information. These reports would be distributed by the Lead Management Intranet Site 34.

In addition, information from the customer lead management database 44 can be exported into other company marketing databases.

The foregoing disclosure is illustrative of the present invention and is not to be construed as limiting thereof. Although one or more embodiments of the invention have been described, persons of ordinary skill in the art will readily appreciate that numerous modifications could be made without departing from the scope and spirit of the disclosed invention. As such, it should be understood that all such modifications are intended to be included within the scope of this invention. The written description and drawings illustrate the present invention and are not to be construed as limited to the specific embodiments disclosed.

What is claimed is:

1. A system for generating, capturing, and managing customer lead information wherein the improvement comprises:
    a customer lead information database having a plurality of customer lead profile records;
    means for acquiring customer lead information from a customer lead;
    means for dynamically capturing and responding to acquired customer lead information via at least one of an intranet and an internet through the use of customer lead web pages which interact with, and request data from, a customer lead management server database, populating the data fields of said pages from said server in real-time;
    means for creating or updating a customer lead profile record based on customer lead information dynamically captured in real-time;
    means for qualifying customer leads and determining a customer lead priority utilizing a ranking algorithm that calculates a customer lead priority score based on budget, authority, needs, and timeframe information in the customer lead profile record, such that the results of said ranking can be displayed in real-time within any web page;
    means for automatically adding the customer lead priority ranking to the customer lead profile record;
    means for automatically storing the customer lead profile record in the customer lead management server database; and
    means for electronically distributing customer lead records and information in real-time, via at least one of an intranet and an internet.

2. The system according to claim 1, further comprising:
    means for automatically electronically notifying at least one designated person when pre-determined data fields of a customer lead profile record are changed or are populated, resulting in a change in customer lead priority ranking, or resulting in any other pre-determined triggering event requiring attention by a company representative.

3. The system according to claim 2, wherein the means for automatically and electronically notifying at least one designated person comprises means for e-mailing, or other electronic alerting, the at least one designated person in real-time.

4. The system according to claim 1, wherein the means for acquiring customer lead information comprises one of means for electronically presenting a customer needs feedback form to a customer lead and means for presenting a lead management form to a company representative.

5. The system according to claim 4, wherein the customer needs feedback form to be completed by a customer lead comprises at least one web page.

6. The system according to claim 1, wherein the means for inputting the acquired customer lead information comprises a means for entering information into the lead management form.

7. The system according to claim 6, wherein the means for inputting the acquired customer lead information comprises means for entering information into the lead management form.

8. The system according to claim 7, wherein the means for entering information into the lead management form comprises at least one of: a microcassette recorder; a portable computer with voice recognition software; a digital portable dictation system with voice recognition software, a hand-held electronic input device; a portable computer with network access; a business card scanner; a magnetic card reader; a bar code scanner; an identification card scanner; and a trade show badge scanner.

9. The system according to claim 1, wherein the means for inputting the acquired customer lead information comprises at least one of: a microcassette recorder; a portable computer with voice recognition software; a digital portable dictation system with voice recognition software, a hand-held electronic input device; a portable computer with network access; a business card scanner; a magnetic card reader; a bar code scanner; an identification card scanner; and a trade show badge scanner.

10. The system according to claim 1, further comprising:
means for electronically responding to information requests from the customer lead in real-time.

11. A system for generating, capturing, and managing customer lead information wherein the improvement comprises:
a customer lead information database having a plurality of customer lead profile records;
means for acquiring customer lead information from a new customer lead and the means for acquiring customer lead information being selected from the group of database records in real-time, consisting of means for presenting a customer feedback form to a customer lead electronically in real-time and means for presenting a lead management form to a company representative electronically in real-time, the customer needs feedback form comprising at least one web page, the lead management form comprising at least one web page;
means for dynamically capturing and responding to acquired customer lead information via at least one of an intranet and an internet through the use of customer lead web pages which interact with, and request data from, a customer lead management server database, populating the data fields of said pages from said server in real-time;
means for creating or updating a customer lead profile record based on customer lead information dynamically captured in real-time;
means for qualifying customer leads and determining a customer lead priority utilizing a ranking algorithm that calculates a customer lead priority score based on budget, authority, needs, and timeframe information in the customer lead profile record; such that the results of said ranking can be displayed in real-time within any web page;
means for automatically adding the customer lead priority ranking to the customer lead profile record;
means for automatically storing the customer lead profile record in the customer lead management server database; and
means for electronically distributing customer lead records and information in real-time, via at least one of an intranet and an internet; and
means for automatically electronically notifying at least one designated person when pre-determined data fields of a customer lead profile record are changed or are populated, resulting in a change in customer lead priority ranking, or resulting in any other pre-determined triggering event requiring attention by a company representative.

12. The system according to claim 11, wherein the means for inputting the acquired customer lead information comprises at least one of: a microcassette recorder; a portable computer with voice recognition software; a digital portable dictation system with voice recognition software, a hand-held electronic input device; a portable computer with network access; a business card scanner; a magnetic card reader; a bar code scanner; an identification card scanner; and a trade show badge scanner.

13. The system according to claim 11, wherein the means for automatically and electronically notifying at least one designated person comprises means for e-mailing, or other electronic alerting, the at least one designated person in real-time.

14. A method for generating, capturing, and managing customer lead information wherein the improvement comprises the steps of:
providing a customer lead information database having a plurality of customer lead profile records;
acquiring customer lead information from a new customer lead and acquiring customer lead information being selected from the group of database records in real-time, using means for presenting a customer feedback form to a customer lead electronically in real-time and means for presenting a lead management form to a company representative electronically in real-time, the customer needs feedback form comprising at least one web page, the lead management form comprising at least one web page;
dynamically capturing and responding to acquired customer lead information via at least one of an intranet and an internet through the use of customer lead web pages which interact with, and request data from, a customer lead management server database, populating the data fields of web pages from the web server in real-time;
creating or updating a customer lead profile record based on customer lead information dynamically captured in real-time;
determining a customer lead priority utilizing a ranking algorithm that calculates a customer lead priority score based on budget, authority, needs, and timeframe information in the customer lead profile record, so that the ranking or score results can be displayed in real-time within any web page;
automatically adding the customer lead priority ranking to the customer lead profile record;
automatically storing the customer lead profile record in the customer lead management server database; and
electronically distributing via at least one of an intranet or an internet, customer lead records and information in real-time.

15. The method according to claim 14, further comprising:
automatically and electronically notifying at least one designated person when pre-determined data fields of a customer lead profile record are changed or are populated, resulting in a change in customer lead priority ranking, or resulting in any other pre-determined triggering event requiring attention of a company representative.

16. The method according to claim 14, further comprising:

Notifying at least one designated person when selected portions of a selected customer lead profile record changes.

17. The method according to claim 16, wherein the step of entering information into a lead management form comprises at least one of:

recording customer lead information with a microcassette recorder;

recording customer lead information with a portable computer having voice recognition software;

recording customer lead information with a digital portable dictation system having voice recognition software;

entering customer lead information on a hand-held electronic input device;

entering customer lead information on a portable computer with network access;

scanning customer lead information with a business card scanner;

scanning customer lead information with a magnetic card reader;

scanning customer lead information with a bar code scanner;

scanning customer lead information with an identification card scanner; and scanning customer lead information with a trade show badge scanner.

* * * * *